United States Patent
Kilgariff et al.

(10) Patent No.: US 9,830,741 B2
(45) Date of Patent: Nov. 28, 2017

(54) SETTING DOWNSTREAM RENDER STATE IN AN UPSTREAM SHADER

(71) Applicant: NVIDIA Corporation, Santa Clara, CA (US)

(72) Inventors: Emmett M. Kilgariff, San Jose, CA (US); Morgan McGuire, Willamstown, MA (US); Yury Y. Uralsky, Moscow (RU); Ziyad S. Hakura, Gilroy, CA (US)

(73) Assignee: NVIDIA Corporation, Santa Clara, CA (US)

( * ) Notice: Subject to any disclaimer, the term of this patent is extended or adjusted under 35 U.S.C. 154(b) by 366 days.

(21) Appl. No.: 13/671,456

(22) Filed: Nov. 7, 2012

(65) Prior Publication Data
US 2014/0125669 A1    May 8, 2014

(51) Int. Cl.
*G06T 15/00* (2011.01)
*G06T 15/80* (2011.01)
*G09G 5/36* (2006.01)

(52) U.S. Cl.
CPC .............. *G06T 15/80* (2013.01); *G06T 15/00* (2013.01); *G06T 15/005* (2013.01); *G09G 5/363* (2013.01)

(58) Field of Classification Search
CPC .............................. G06T 15/00; G06T 15/005
See application file for complete search history.

(56) References Cited

U.S. PATENT DOCUMENTS

| | | | |
|---|---|---|---|
| 6,956,576 B1* | 10/2005 | Deering et al. | 345/475 |
| 7,184,040 B1* | 2/2007 | Tzvetkov | G06T 15/005 345/419 |
| 7,499,051 B1 | 3/2009 | O'Donnell | |
| 2008/0001952 A1* | 1/2008 | Srinivasan | G06T 1/20 345/502 |
| 2008/0266286 A1 | 10/2008 | Ramey et al. | |
| 2009/0231349 A1* | 9/2009 | Mejdrich et al. | 345/506 |
| 2010/0013842 A1 | 1/2010 | Green et al. | |
| 2011/0242119 A1* | 10/2011 | Bolz et al. | 345/522 |
| 2011/0249011 A1* | 10/2011 | Lalonde | G06T 11/40 345/522 |

OTHER PUBLICATIONS

"Open GL Super Bible: The OpenGL State Machine," 2006, retrieved on Dec. 2, 2014 from http://opengl.czweb.org/ch14/462-465.html.*

(Continued)

*Primary Examiner* — Ryan D McCulley
(74) *Attorney, Agent, or Firm* — Artegis Law Group, LLP

(57) ABSTRACT

Techniques are disclosed for processing graphics objects in a stage of a graphics processing pipeline. The techniques include receiving a graphics primitive associated with the graphics object, and determining a plurality of attributes corresponding to one or more vertices associated with the graphics primitive. The techniques further include determining values for one or more state parameters associated with a downstream stage of the graphics processing pipeline based on a visual effect associated with the graphics primitive. The techniques further include transmitting the state parameter values to the downstream stage of the graphics processing pipeline. One advantage of the disclosed techniques is that visual effects are flexibly and efficiently performed.

22 Claims, 12 Drawing Sheets

(56) References Cited

OTHER PUBLICATIONS

Eckstein, "Learning Java 2D, Part 1," 2005, retrieved on Dec. 1, 2014 from http://www.oracle.com/technetwork/java/jacamail/java2dpart1-137217.html.*

"GPU Programming Guide, GeForce 8 and 9 Series," 2008, NVIDIA Corporation, p. 1-5, 43-44, 55-57.*

Hasselgren et al., "GPU Gems 2, Chapter 42: Conservative Rasterization," 2005, NVIDIA Corporation.*

* cited by examiner

SETTING DOWNSTREAM RENDER STATE IN AN UPSTREAM SHADER

BACKGROUND OF THE INVENTION

Field of the Invention

The present invention generally relates to three-dimensional (3D) graphics processing, and, more particularly, to setting downstream render state in an upstream shader.

Description of the Related Art

Computer generated images that include 3D graphics objects are typically rendered using a graphics processing unit (GPU) with one or more multistage graphics pipelines. Such graphics pipelines include various programmable and fixed function stages. Programmable stages include various processing units that execute shader programs to render graphics objects and to generate various visual effects associated with graphics objects. These shaders programs include: (i) vertex shaders that transform the 3D position of each vertex associated with a graphics object to a 2D position on the screen surface of a display device; (ii) tessellation shaders that divide graphics objects into smaller graphics objects or graphics primitives, such as lines and triangles; (iii) geometry shaders that receive geometric primitives and generate fragments, each of which includes one or more picture elements (pixels); and (iv) pixel shaders that receive the fragments and compute color and other attributes of each individual pixel. Various fixed function stages exist in the pipeline among the programmable shaders, where those fixed function stages perform specific defined functions within the pipeline. Such fixed function stages include viewport culling units, clipping units, setup calculation units, rasterization units, and units configured to perform preROP (pre-raster operations), color operations, or depth buffer operations.

Typically, in a graphics-based implementation, a central processing unit (CPU) transmits graphics objects to the GPU for rendering and display. The CPU may also transmit certain state conditions for the various programmable and fixed stages in the graphics pipeline. However, these state conditions are sent before or after sending a graphics object. As such, the state parameters are fixed when rendering a particular graphics object.

Because the state parameters of the graphics pipeline stages are fixed when rendering a particular graphics object, certain visual effects are cumbersome to generate. For example, hair or fur can be rendered with anti-aliased polylines, where a polyline includes multiple line segments connected in series. A realistic appearance can be achieved by varying the thickness of the polyline such that line segments that are nearer to the screen surface of a display device are thicker than line segments farther away from the screen surface. However, the CPU generally cannot change the thickness of line segments in a given polyline. As a result, the anti-aliased line segments of a given polyline are of uniform thickness. This can give the appearance of a strand of hair that is two thin in the front and too thick in the back.

One possible solution to the above problem is that the CPU can divide a graphics object into smaller graphics objects or into graphics primitives, a process called tessellation. The CPU can then update the state parameters between transmission of the smaller graphics objects or graphics primitives, providing more flexibility in generating various effects. As an example, each line segment of a polyline could be separately transmitted from the CPU to the GPU, where the CPU specifies the thickness of each separately transmitted line segment. One drawback with this approach is that the CPU is less efficient in performing tessellation operations than the GPU. By moving some or all of an entire tessellation task from the GPU to the CPU, overall system performance is reduced. Alternatively, the GPU can continue to perform tessellation, but certain effects are not going to be achievable because of the limitations described above.

As the foregoing illustrates, what is needed in the art is an improved technique for processing graphics objects in a graphics pipeline.

SUMMARY OF THE INVENTION

One embodiment of the present invention sets forth a method for processing graphics objects in a first stage of a graphics processing pipeline. The method includes receiving a graphics primitive associated with the graphics object, and determining a plurality of attributes corresponding to one or more vertices associated with the first graphics primitive. The method further includes determining a value for a state parameter associated with a second stage of the graphics processing pipeline based on a visual effect associated with the graphics primitive, and transmitting the value to the second stage of the graphics processing pipeline.

Other embodiments include, without limitation, a subsystem that includes a geometry processing unit configured to implement one or more aspects of the disclosed methods as well as a system configured to implement one or more aspects of the disclosed methods.

One advantage of the disclosed techniques is that graphics effects are flexibly and efficiently performed.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
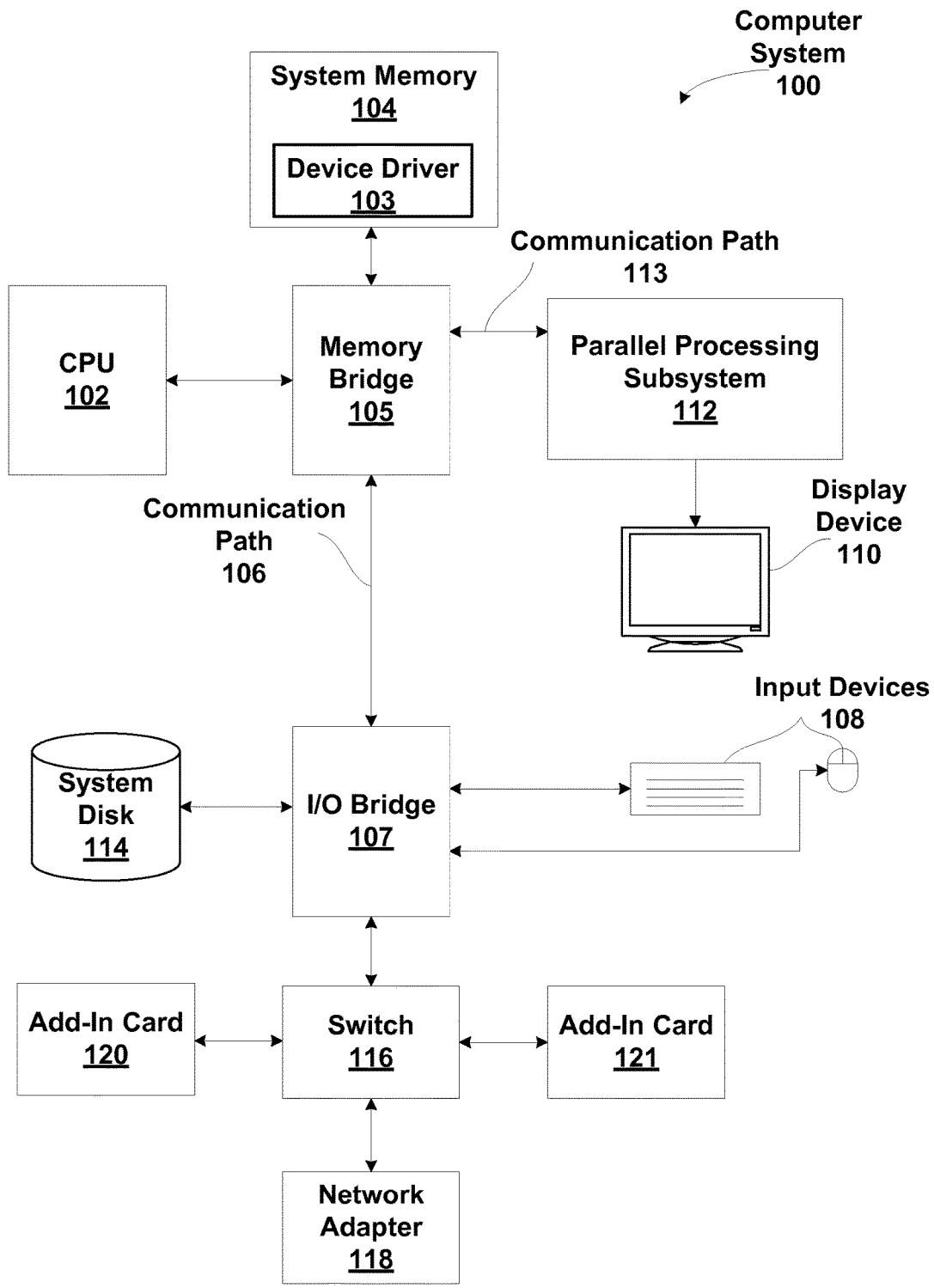
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol (s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
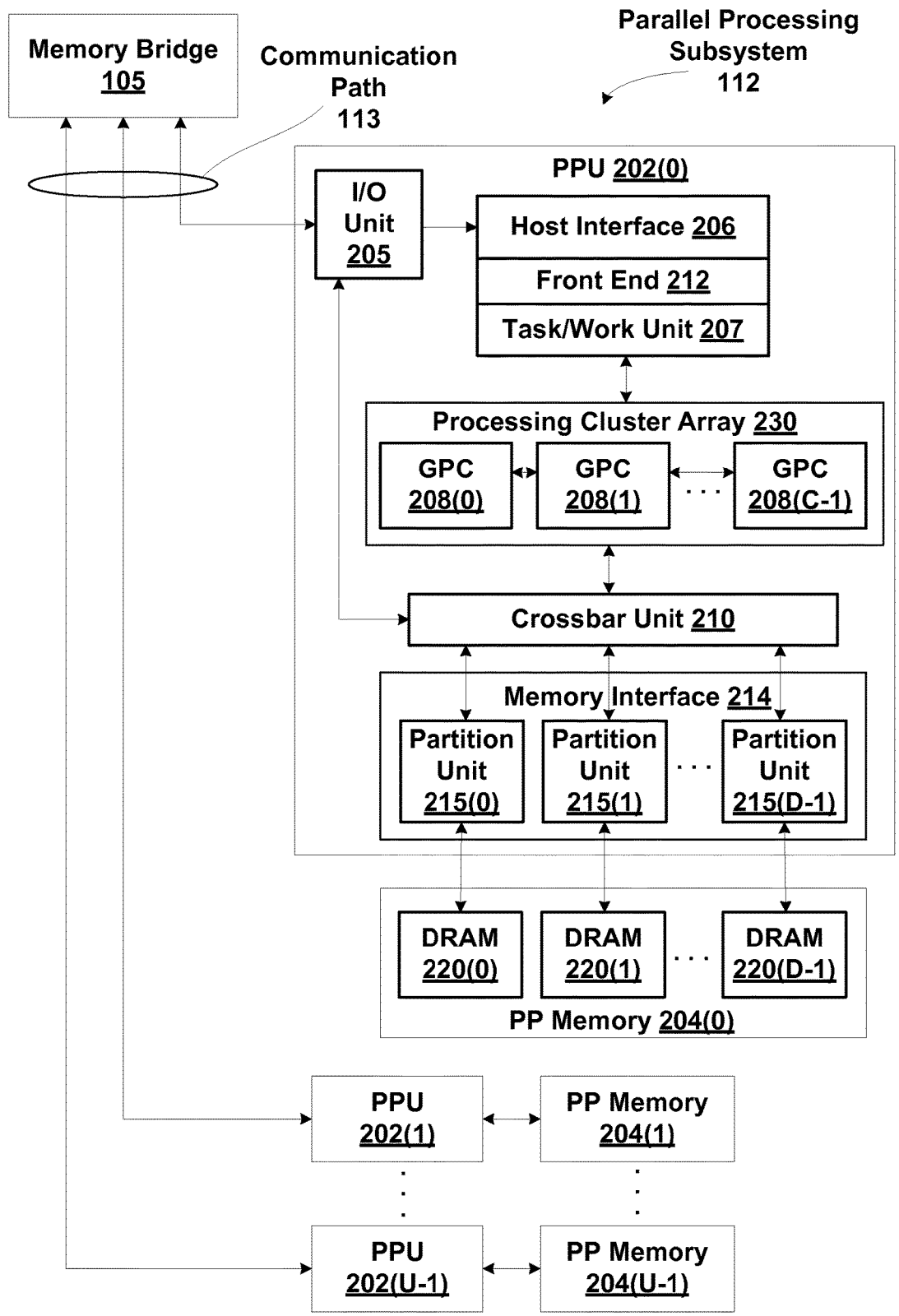
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
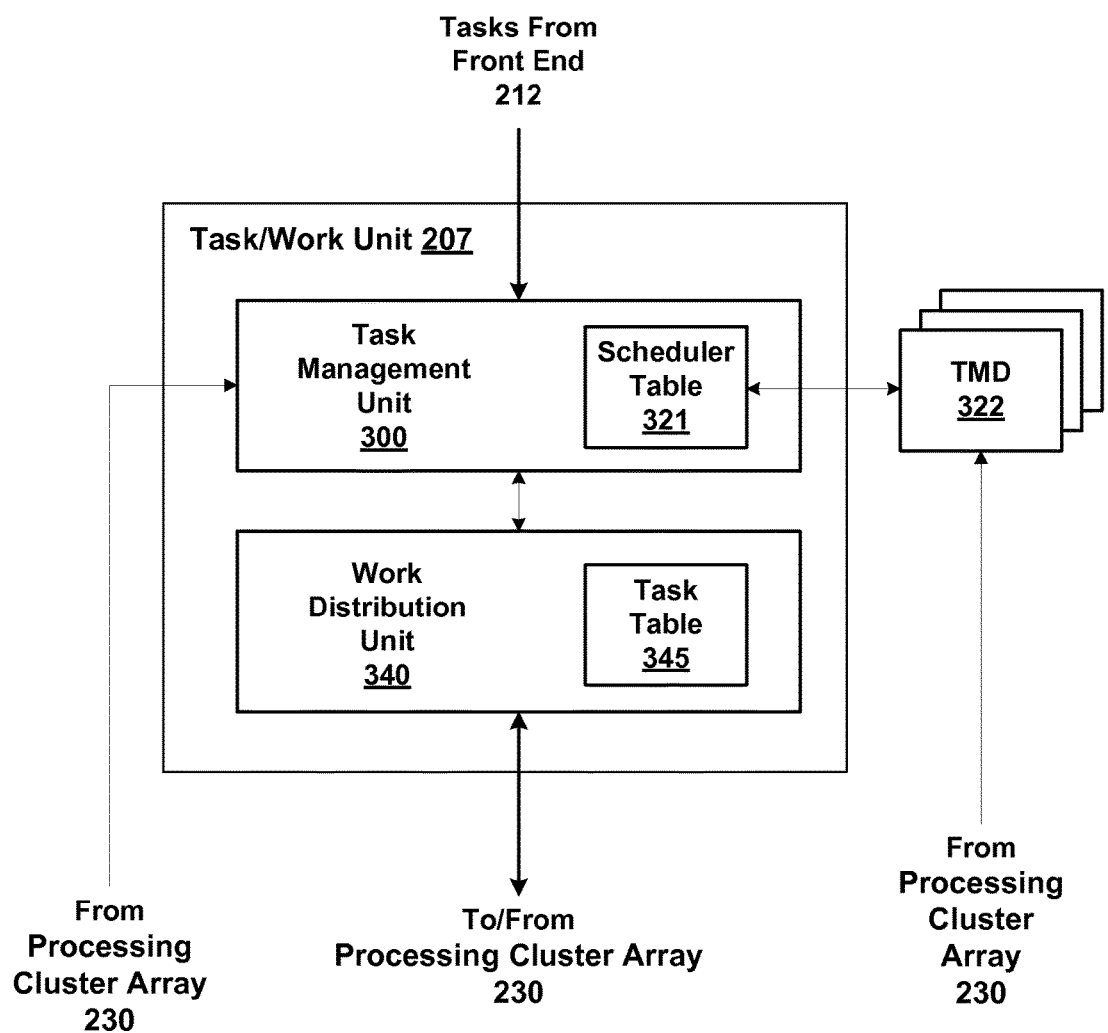
FIG. 3A is a block diagram of the front end of FIG. 2, according to one embodiment of the present invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a linked list of pointers to the QMDs 322 corresponding to the tasks in the scheduler table 321. The QMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution, enabling the task management unit 300 to schedule tasks based on priority information or using other techniques.

The work distribution unit 340 includes a task table 345 with slots that may each be occupied by the QMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and, if execution the task is not complete, the task is added to a linked list in the scheduler table 321. When a child processing task is generated, the child task is added to a linked list in the scheduler table 321. A task is removed from a slot when the task is evicted.

Task Processing Overview

Figure 3B:
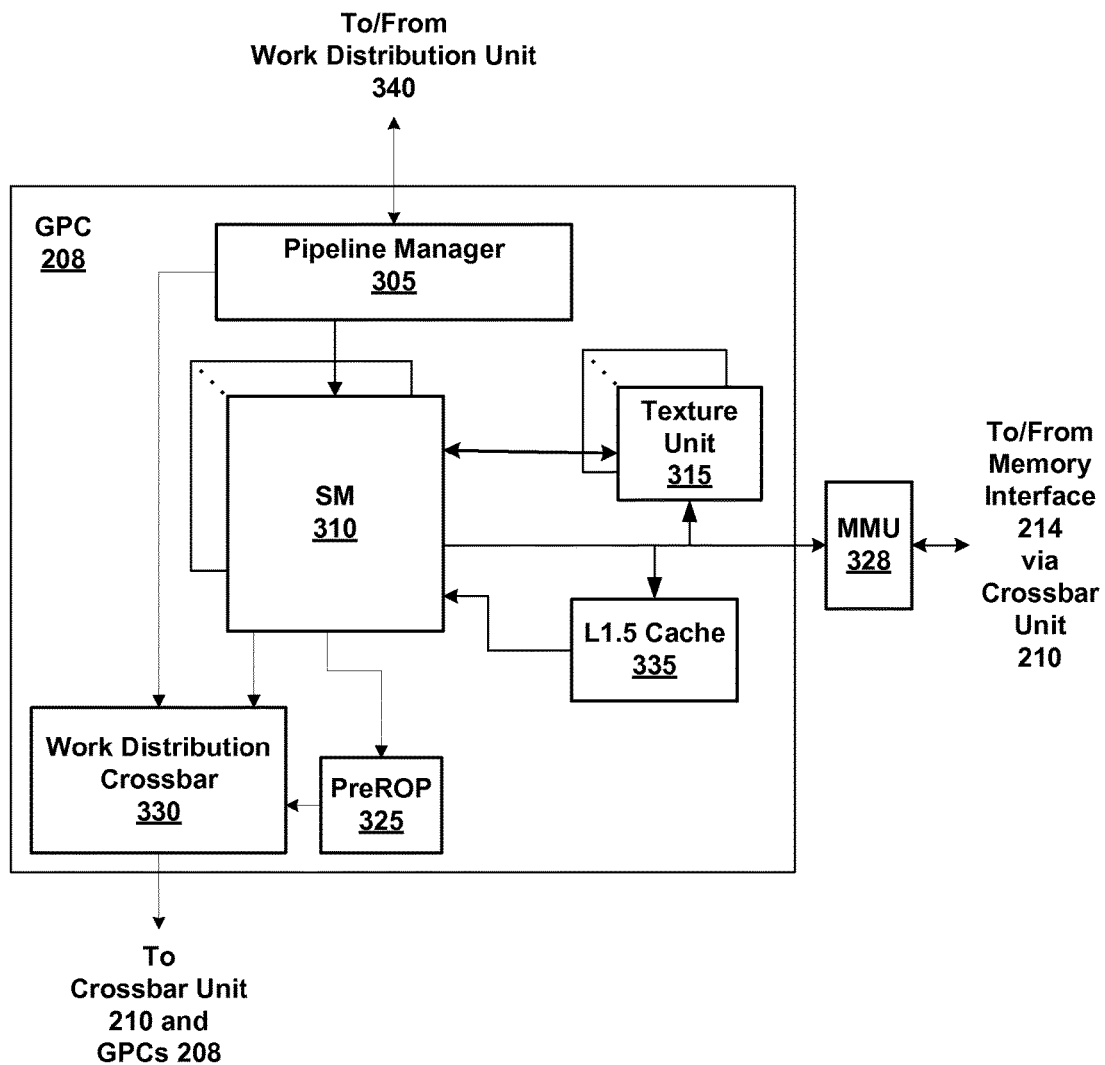
FIG. 3B is a block diagram of a general processing cluster within one of the parallel processing units of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
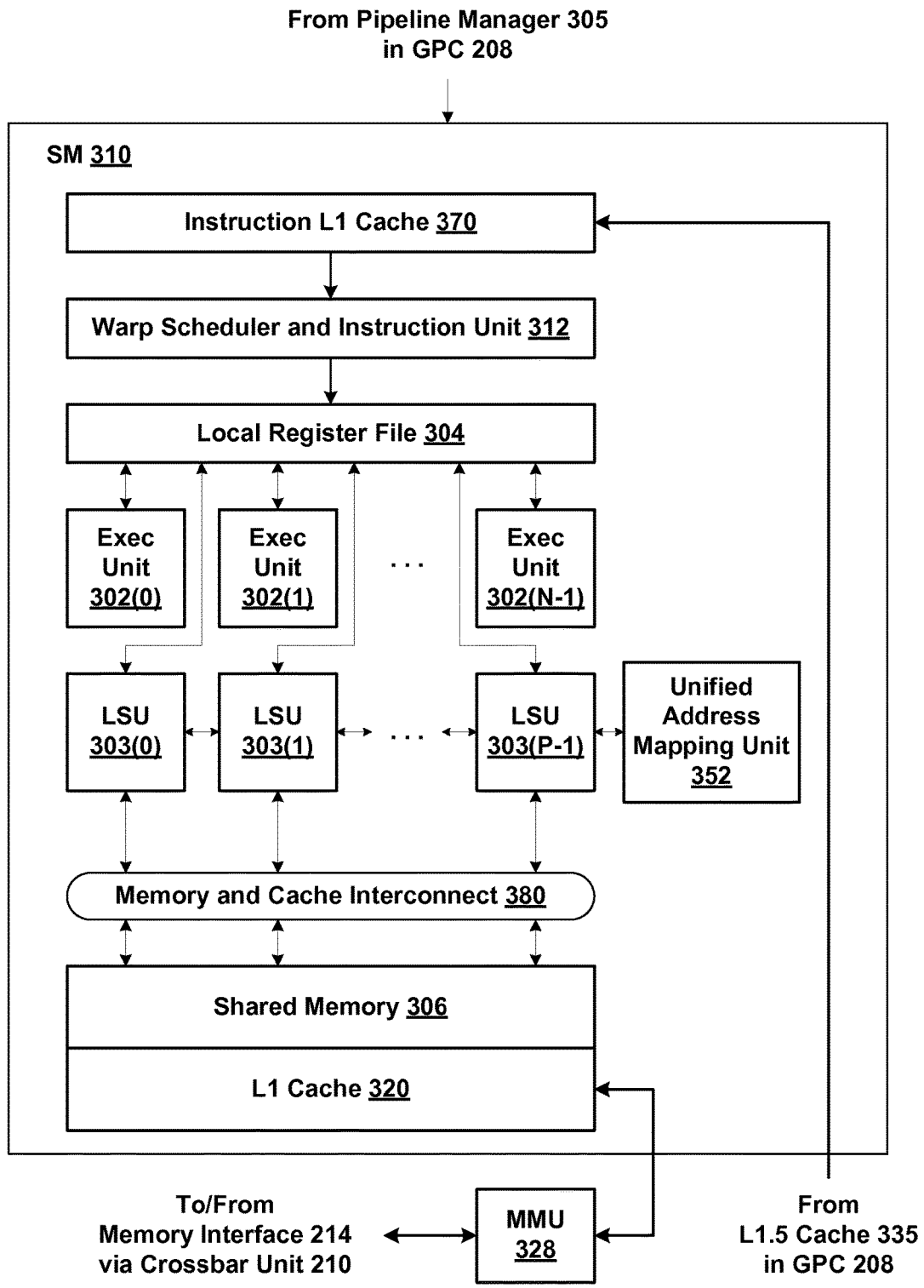
FIG. 3C is a block diagram of a portion of the streaming multiprocessor of FIG. 3B, according to one embodiment of the present invention.

FIG. 3C is a block diagram of the SM 310 of FIG. 3B, according to one embodiment of the present invention. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads in the same grid or queue (or by all LSUs 303) that store a CTA identifier, the CTA dimensions, the dimensions of a grid to which the CTA belongs (or queue position if a queue), and an identifier of the grid or queue to which the CTA belongs. CTAs that belong to a grid have implicit x,y,z parameters indicating the position of the respective CTA within the grid. Special registers are written during initialization in response to commands received via front end 212 from device driver 103 and do not change during execution of a processing task. The front end 212 schedules each processing task for execution as either a grid or queue. Each CTA is associated with a specific grid or queue for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

Graphics Pipeline Architecture

Figure 4:
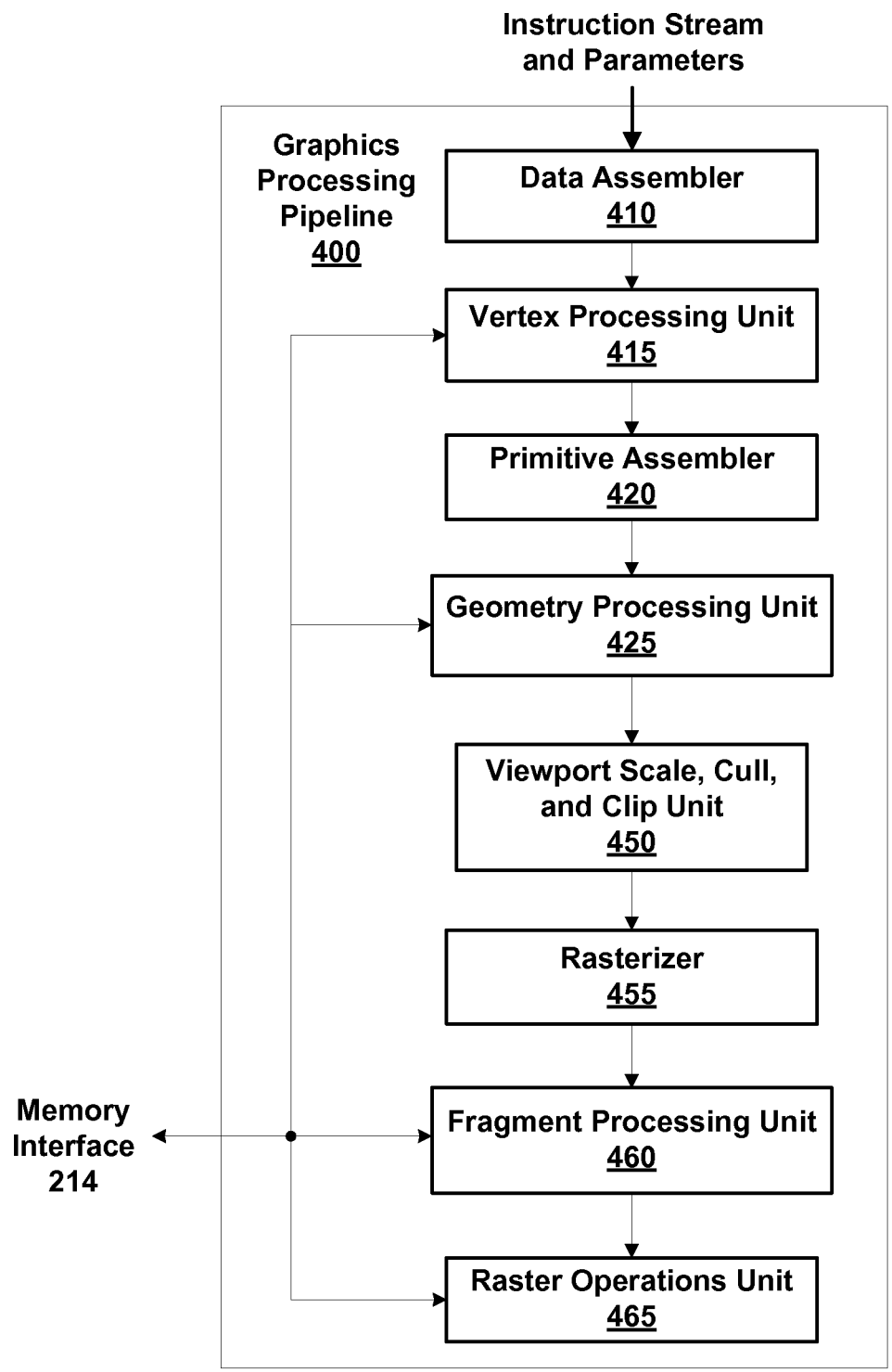
FIG. 4 is a conceptual diagram of a graphics processing pipeline that one or more of the parallel processing units of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

To achieve certain visual effects using the graphics processing pipeline 400, certain pipeline stages, such as the geometry processing unit 425, are configured to set the render state of downstream pipeline stages by generating and transmitting one or more state parameters to these downstream pipeline stages. Such techniques are further described below.

Setting Downstream Render State in an Upstream Shader

As described above in conjunction with FIG. 4, the geometry processing unit 425 is configured to execute geometry shader programs. For example, such geometry shader programs could, transform graphics primitives by subdividing the graphics primitives into one or more new graphics primitives and calculating parameters or attributes, such as plane equation coefficients, that are used to rasterize the new graphics primitives. In addition, the geometry shaders could also determine one or more state attributes associated with the render state of a downstream stage of the graphics processing pipeline 400. As further described below in conjunction with FIGS. 5-10, these state attributes could be appended to the attributes for the vertices associated with the graphics primitives. The state parameters would be processed by the downstream stage of the graphics processing pipeline 400, achieving one or more visual effects associated with the graphics primitives. The state parameters could be determined for each graphics primitive transmitted by the geometry processing unit 425.

Figure 5:
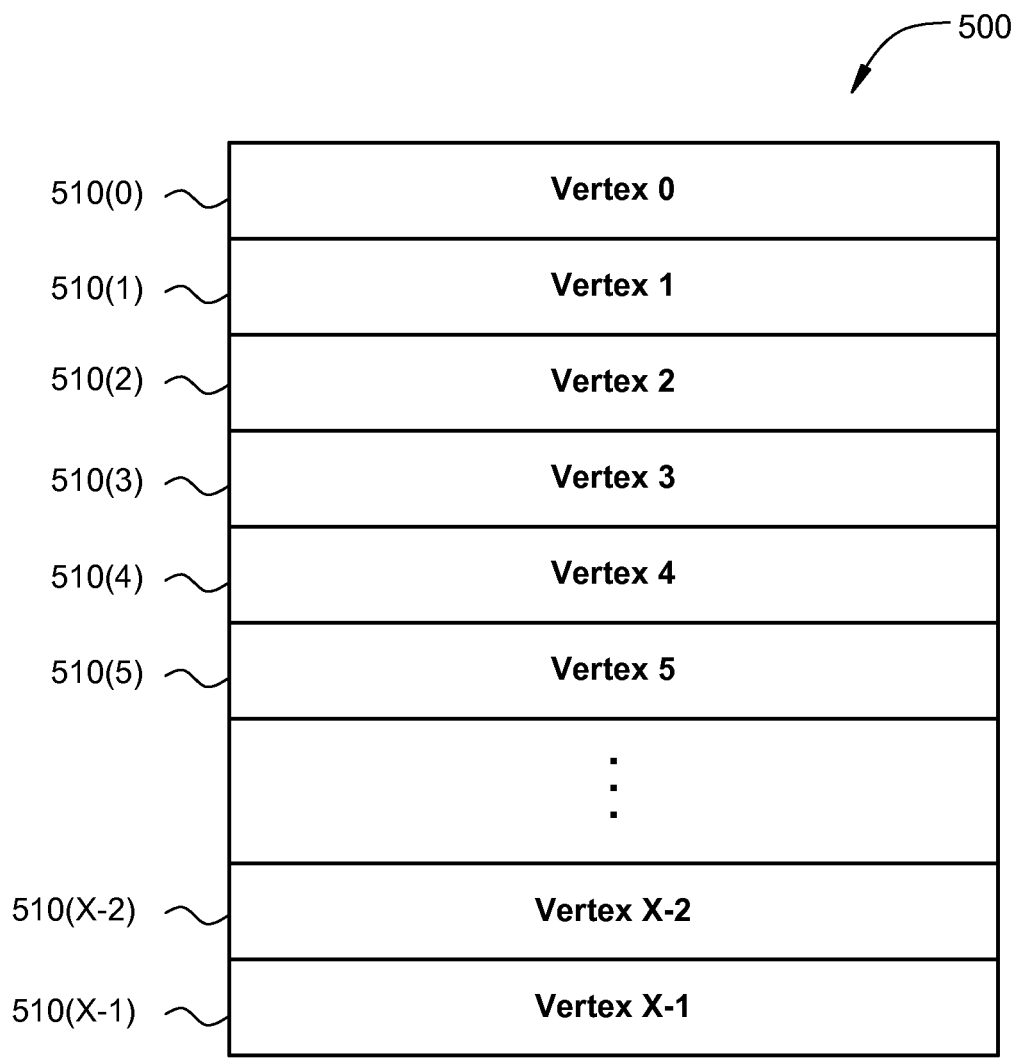
FIG. 5 illustrates a vertex chain to be processed by the graphics processing pipeline of FIG. 4, according to one embodiment of the invention.

FIG. 5 illustrates a vertex chain 500 to be processed by the graphics processing pipeline 400 of FIG. 4, according to one embodiment of the invention. As shown, the vertex chain 500 includes a plurality of vertices 510.

Each vertex 510 identifies a position in 3D space where a portion of a geometry primitive is defined. The vertex 510 includes various attributes as further described below, including, without limitation, the 3D position in space, the color of a graphics primitive associated with the vertex, and the material attributes of the geometry primitive (such as whether the graphics primitive renders using a shiny finish or a flat finish).

Typically, geometry primitives are transmitted as a series of vertices called a vertex chain 500, where each vertex 510 includes various attributes, as further described below. When processing a vertex chain 500, the geometry processing unit 425 forms various geometry primitives by grouping two or more vertices 510 together.

In one example, the vertex chain 500 could define a polyline, where a polyline includes multiple line segments connected together. In such a case, each line segment is defined by a pair of vertices 510. Vertex 510(0) and vertex 510(1) define the first line segment, vertex 510(1) and vertex 510(2) define the second line segment, vertex 510(2) and vertex 510(3) define the third line segment, and so on. Because each line segment connects to the next line segment, the ending vertex 510 of one line segment is shared with the first vertex 510 of the next line segment. As such, the second line segment connects to the first line segment at vertex 510(1), the third line segment connects to the second line segment at 510(2), and so on. Shared vertices are typically transmitted once.

In one embodiment, certain attributes for a line segment that are common across the entire line segment may be transmitted with only one of the two vertices 510 that define the line segment. Such attributes may include the color of a line segment, for a line segment whose color does not vary between endpoints. These attributes may be transmitted with the first vertex of a line segment, called the provoking vertex. As such, vertex 510(0) may be the provoking vertex for the first line segment, vertex 510(1) may be the provoking vertex for the second line segment, and so on.

In another embodiment, a vertex chain 500 may include two or more disjoint polylines, where a particular line segment does not connect to the next line segment. In such a case, the vertex chain 500 includes a parameter that defines a cut point. For example, the vertex chain could include a cut point between vertex 510(3) and vertex 510(4). In such a case, there would be no line segment connecting vertex 510(3) and 510(4). Rather, vertex 510(3) would define the end of one polyline and vertex 510(4) would define the beginning of another polyline.

In another example, the vertex chain 500 could define a chain of connected triangles, where each triangle is connected to the next triangle along one of the three sides. In such a case, each triangle is defined by three vertices 510. Vertices 510(0), 510(1), and 510(2) define the first triangle, vertices 510(1), 510(2), and 510(3) define the second triangle, vertices 510(2), 510(3) and 510(4) define the third triangle, and so on. Because each triangle connects to the next triangle, the last two vertices 510 of one triangle are shared with the first two vertices 510 of the next triangle. As such, the second triangle connects to the first triangle at vertices 510(1) and 510(2), the third triangle connects to the second triangle at vertices 510(2) and 510(3), and so on. Shared vertices are typically transmitted once.

In one embodiment, certain attributes for a triangle that are common across the entire triangle may be transmitted with only one of the three vertices 510 that define the triangle. Such attributes may include the color of a flat shaded triangle. These attributes may be transmitted with the first vertex of a triangle, called the provoking vertex. As such, vertex 510(0) may be the provoking vertex for the first triangle, vertex 510(1) may be the provoking vertex for the second triangle, and so on.

In yet another embodiment, a vertex chain 500 may include two or more disjoint triangle chains, where a particular triangle does not connect to the next triangle. In such a case, the vertex chain 500 includes a parameter that defines a cut point. For example, the vertex chain could include a cut point between vertex 510(3) and vertex 510(4). In such a case, vertex 510(3) would define the end of one triangle chain and vertex 510(4) would define the beginning of another triangle chain.

Figure 6:
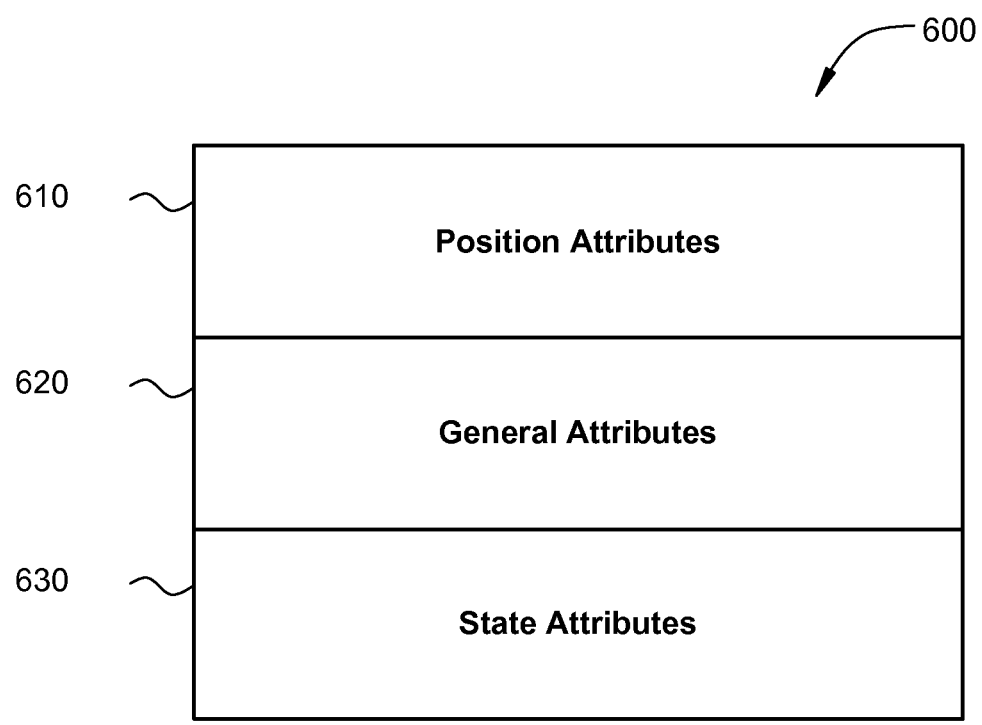
FIG. 6 illustrates a data structure specifying the vertex data associated with one of the vertices of FIG. 5, according to one embodiment of the invention.

FIG. 6 illustrates a data structure specifying the vertex data 600 associated with one of the vertices of FIG. 5, according to one embodiment of the invention. The data structure includes vertex attributes 610, general attributes 620, and state attributes 630.

Vertex attributes 610 are those attributes which vary vertex-by-vertex across a given graphics primitive. Such attributes include, without limitation, the position of a vertex in 3D space, and the color of the vertex, for graphics primitives that vary in color. Vertex attributes are determined based on the graphics primitives received by the geometry processing unit 425.

General attributes 620 are those attributes which do not vary vertex-by-vertex across a given graphics primitive. Such attributes include, without limitation, the color of a flat shaded graphics primitive, material attributes of a graphic primitive, and whether a cut in the vertex chain occurs at the current vertex. General attributers are included for only one vertex of the given graphics primitive, typically the provoking vertex, as described above. General attributes are determined based on the graphics primitives received by the geometry processing unit 425.

State attributes 630 are those attributes which change the state of one or more functional units of the graphics processing pipeline 400 that are downstream of the geometry processing unit 425. As further described below, such attributes include, without limitation, the multisample mask for a given graphics primitive rendered with motion blur, the thickness of a line segment in an anti-aliased polyline, and the scissor box for a triangle rendered using conservative rasterization. State attributes 630 can vary for a given graphics primitive and are included for only one vertex of the given graphics primitive, typically the provoking vertex, as described above. State attributes are determined by the geometry processing unit 425 based on the graphics shader program currently executing. As such, state attributes are injected by the geometry processing unit 425 into the vertex data 600 as part of the vertex chain 500.

In one embodiment, the state attributes may be mapped to state bundles. An application program may specify one or more state attributes that are affected during execution of the application program. The device driver 103 may map each of these affected state attribute to a corresponding state attribute number, where the state attribute number identifies the location of the affected state attribute within the state attributes 630. The device driver 103 may also communicate a mapping table, where the mapping table relates state attribute numbers to corresponding state bundle identifiers (state bundle IDs). Each state bundle ID corresponds to the location of the affected state attribute within a state bundle. Such a state bundle may reside in one or more units in the graphics processing pipeline 400 that are downstream of the geometry processing unit 425. The state bundle may define the set of state attributes accessed by the one or more downstream units in the graphics processing pipeline 400.

In this embodiment, the application program may specify one or more affected state attributes. The geometry processing unit 425, during execution of a geometry shader program, may alter the affected state attributes on a per-primitive basis. The geometry processing unit 425 may insert the values for the affected state attributes into locations within the state attributes 630, where the locations within the state attributes 630 are determined by corresponding state attribute numbers. The geometry processing unit 425 transmits the state attributes 630, including the affected state variables, when transmitting the vertex data 600. A unit downstream of the geometry processing unit 425 may read the values for affected state attributes within the state attributes 630. The downstream unit may then cross reference the state attribute number for each affected state variable to a corresponding state bundle ID. The downstream unit may then write the new value for the affected state attribute, as specified in the received state attributes 630, into the state bundle at the location specified by the state bundle ID. Once the downstream unit has written new values for each of the affected state attributes, the downstream unit processes the geometry primitive according to the updated state attributes within the state bundle.

Figure 7A:
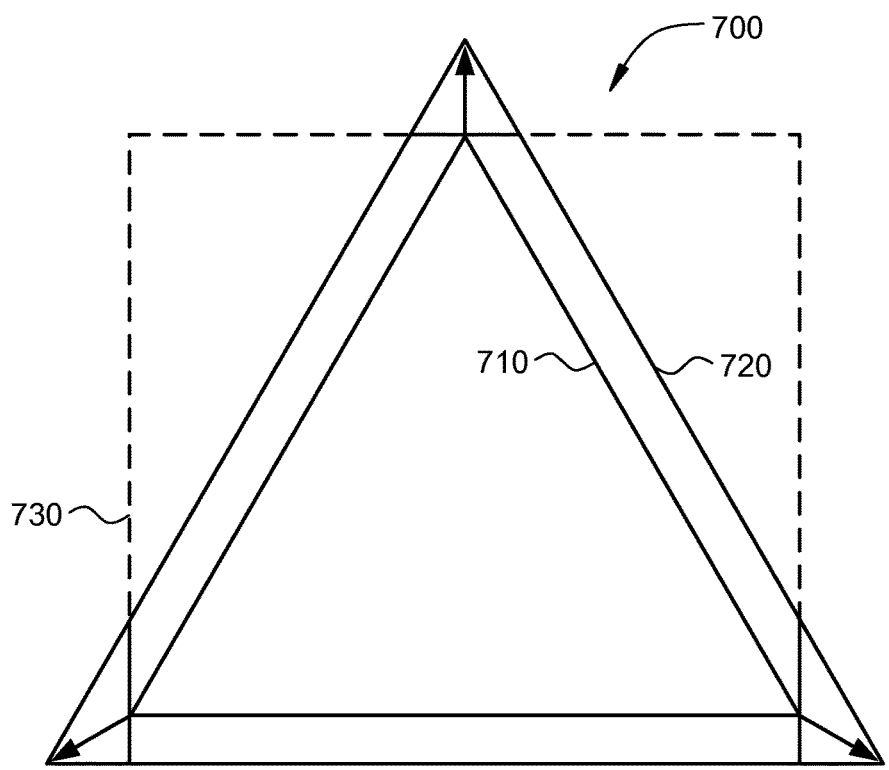
FIGS. 7A and 7B illustrate a triangle rendered using a conservative raster approach, according to one embodiment of the invention.
Figure 7B:
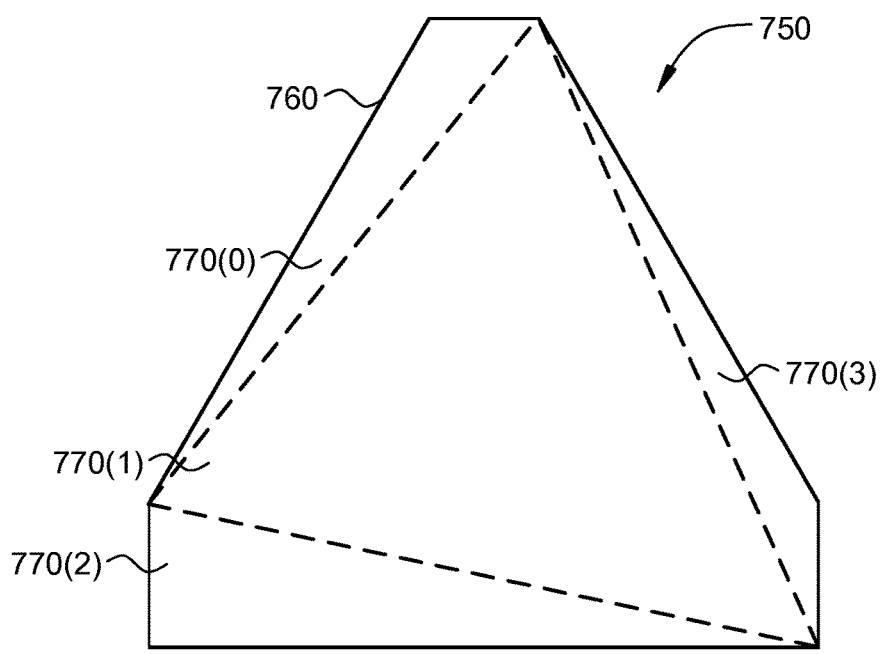

FIGS. 7A and 7B illustrate a triangle rendered using a conservative raster approach, according to one embodiment of the invention. As shown in FIG. 7A, a triangle 710 rendered using conservative rasterization is first expanded in all directions to cover the surface area shown by triangle 720. With conservative rasterization, each pixel in screen space is considered to be covered if any portion of the triangle 710 intersects with the pixel. After the triangle 710 is expanded to triangle 720, a scissor box 730 is applied to clip triangle 720. A scissor box 730 is a bounding box in the form of a rectangle in screen space that specifies a clipping region for expanded triangle 720 before rasterization. The scissor box 730 is determined by the geometry processing unit 425 and inserted into the state attributes 630 for the rendered triangle 720.

As shown in FIG. 7B, polygon 760 represents the triangle 720 after scissor box 730 is applied. Polygon 760 represents the portion of triangle 720 inside the scissor box 730 that is rendered by later states in the graphics processing pipeline 400. The portion of triangle 720 lying outside the scissor box 730 is not rendered by later states in the graphics processing pipeline 400. If, for example, the geometry processing unit 425 was unable to apply the scissor box 730 to the triangle 720, the CPU could implement conservative rasterization by rendering multiple triangles for each source triangle, as shown by triangles 770(0)-770(3).

Figure 8A:
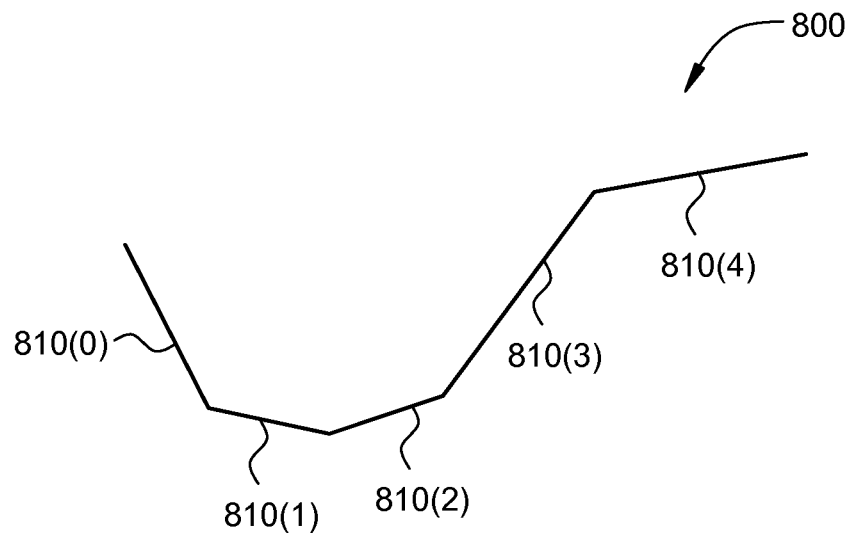
FIGS. 8A and 8B illustrate a polyline rendered using variable width anti-aliased lines, according to one embodiment of the invention.
Figure 8B:
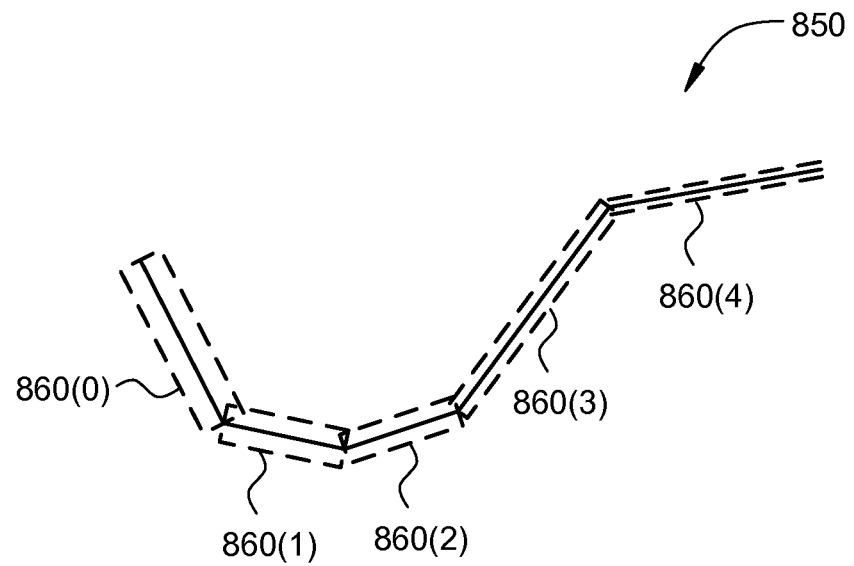

FIGS. 8A and 8B illustrate a polyline 800 rendered using variable width anti-aliased lines, according to one embodiment of the invention. As shown in FIG. 8A, polyline 800 includes multiple line segments 810(0)-810(4). To achieve a realistic result, certain anti-aliased lines are rendered with variable width, typically as a function of depth. That is, portions of the polyline 800 that are closer to the screen surface of the display device are rendered with a greater thickness, while portions of the polyline 800 that are farther from the screen surface of the display device are rendered with a lesser thickness. Such an approach generates a more realistic appearance when rendering certain objects such as hair or fur.

As shown in FIG. 8B, variable thickness is applied to polyline 800, resulting in polyline 850. In one example, the geometry processing unit 425 could determine that line segment 810(0) is the line segment is closest to the screen surface. As a result, the geometry processing unit 425 would specify a relatively large thickness for the corresponding anti-aliased line segment 860(0). The geometry processing unit 425 could determine that each successive line segment 810(1)-810(4) are progressively further away from the screen surface. As a result, the geometry processing unit 425 would specify successively smaller thicknesses for the corresponding anti-aliased line segments 860(1)-860(4). The geometry processing unit 425 could insert thickness values as state parameters 630 for the provoking vertex corresponding to each line segment 810.

Figure 9:
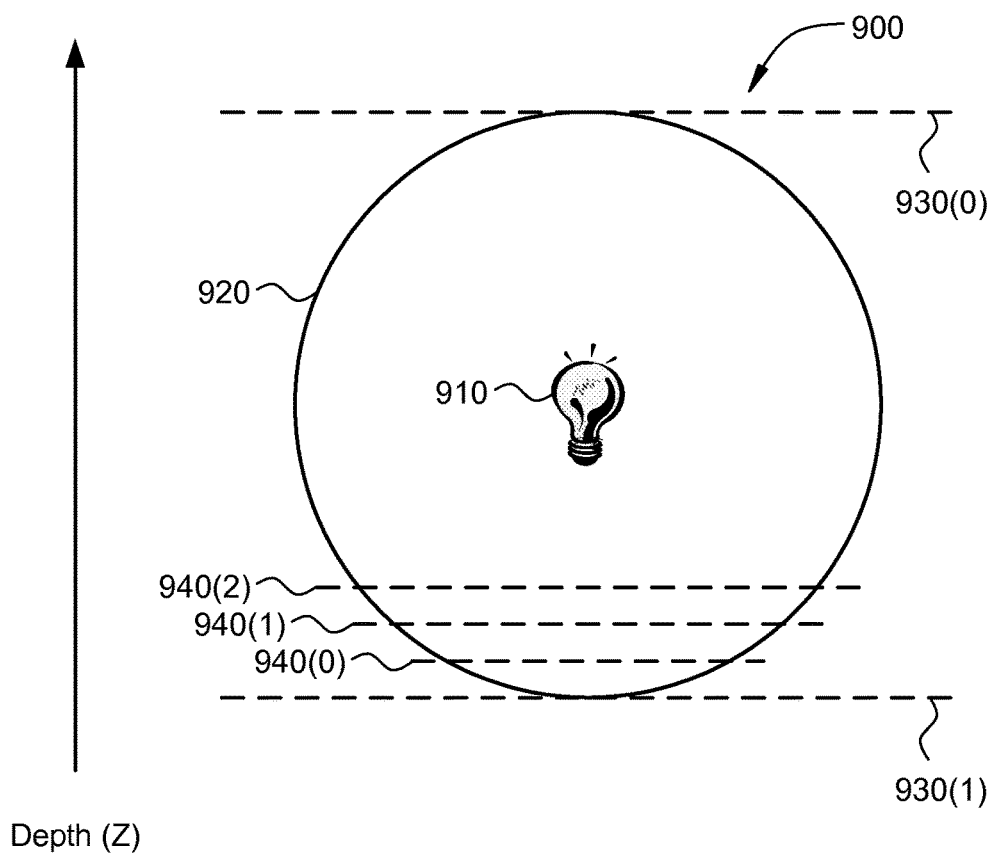
FIG. 9 illustrates a light source with per-graphics primitive depth bounds, according to one embodiment of the invention.

FIG. 9 illustrates a light source with per-graphics primitive depth bounds, according to one embodiment of the invention. As shown, a light source 910 is evaluated over a bounding sphere 920 having a maximum depth 930(0) and a minimum depth 930(1). The vertices of various graphics primitives in a 3D scene are tested against the maximum depth 930(0) and the minimum depth 930(1) to determine whether the graphics primitives are rendered or not. In some embodiments, the graphics primitives are associated with light bounding volumes that define portions of a 3D scene illuminated by light source 910. In such cases, performance may be improved by setting finer granularity depth bounds than that given by the maximum depth 930(0) and the minimum depth 930(1). Each graphics primitive may be tested against a finer resolution depth bounds represented by a smaller range between minimum or maximum depth. For example, a graphics primitive that is closer to the screen surface could be depth bounds tested using a minimum depth represented by 930(1) and a maximum depth represented by 940(0). A graphics primitive slightly farther from the screen surface could be depth bounds tested using a minimum depth represented by 940(0) and a maximum depth represented by 940(1). A graphics primitive even slightly farther from the screen surface could be depth bounds tested using a minimum depth represented by 940(1) and a maximum depth represented by 940(2), and so on. The geometry processing unit could specify the minimum depth and maximum depth for each graphics primitive by inserted these depth bounds as state parameters 630 for the provoking vertex corresponding to each graphics primitive.

Figure 10:
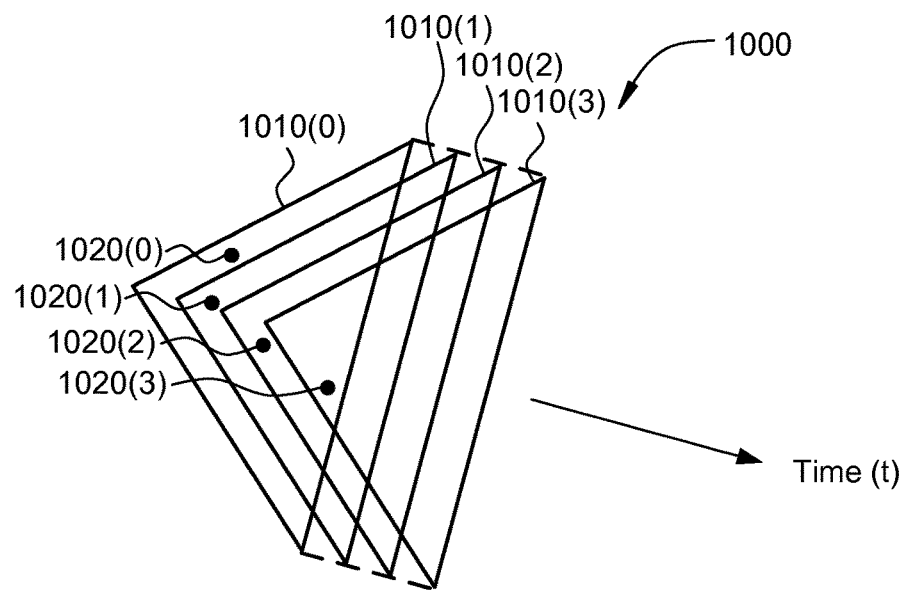
FIG. 10 illustrates a triangle rendered using motion blur, according to one embodiment of the invention.

FIG. 10 illustrates a triangle rendered using motion blur, according to one embodiment of the invention. As shown, with motion blur, the geometry processing unit 425 expands a triangle 1010(0) into multiple triangles 1010(0)-1010(3) along a path of motion over time (t). Each triangle 1010 includes a multisample mask (not shown) that specifies which pixels of the triangle 1010 are to be written by a downstream pixel shader program. By changing the multisample mask for each triangle 1010, the geometry processing engine can effectively implement a blending operation that blends the triangles 1010(0)-1010(3). Such a blending operation creates the effect of motion blur. To implement motion blur, the geometry processing unit generates multiple triangles 1010(0)-1010(3). for each triangle received 1010 (0). Each of the multiple triangles 1010(0)-1010(3) has a different vertex positions as specified in the vertex attributes 610 and different multisample masks as specified in the state attributes 630 of the provoking vertex.

The blending operation accounts for the fact that some pixels are covered for a shorter period of time during the motion blur than other pixels. As shown, pixel 1020(0) is covered only by triangle 1010(0) but is not covered by triangles 1010(1)-1010(3). Pixel 1010(1) is covered by triangles 1020(0) and 1020(1), Pixel 1010(2) is covered by triangles 1020(0)-1020(2), and Pixel 1010(3) is covered by all four triangles 1020(0)-1020(3). By varying the multisample masks for each triangle 1010, the various pixels 1020 will be rendered with more or less transparency as function of coverage by the triangles 1010 over time.

It will be appreciated that the architecture described herein is illustrative only and that variations and modifications are possible. In one example, the techniques described herein could be used in association with devices other than a geometry processing unit 425 executing a geometry shader program, including, without limitation, devices associated with vertex shader programs, tessellation shader programs, and pixel shader programs. In another example, state attributes could be specified for some, but not all, graphics primitives in a graphics object. Depending on the application, state attributes 630 could be specified for various portions of a graphics object, including, without limitation, every fifth graphics primitive within a graphics object, the first portion of a graphics object, or a last portion of a graphics object.

In yet another example, the geometry processing unit 425 could stop inserting state attributes 630 for each graphics primitive and restore the default state parameters specified by the CPU for the graphics object. In yet another example, the geometry processing unit 425 could transmit the state parameters 630 when one or more state parameters 630 have changed since the last transmission. If no state parameters 630 have changed since the last transmission, then the geometry processing unit 425 would not send any state parameters 630. In yet another example, the geometry processing unit 425 would not send state parameters 630 as part of the attributes for a provoking vertex. In such a case, the geometry processing unit 425 could use any technically feasible approach to transmit state parameters 630 to downstream stages of the graphics processing pipeline 400.

Figure 11:
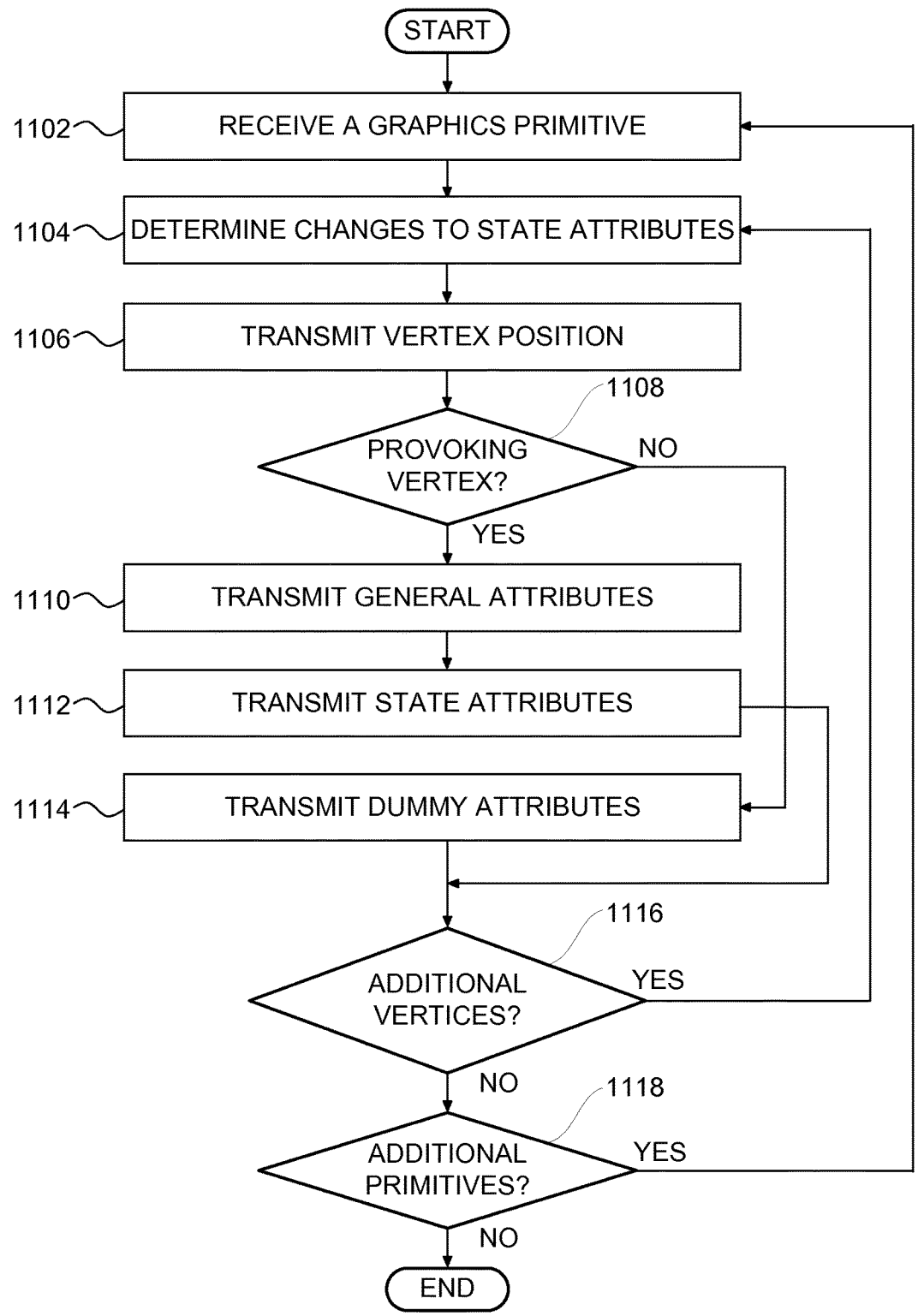
FIG. 11 sets forth a flow diagram of method steps for processing graphics objects in a stage of a graphics processing pipeline, according to one embodiment of the present invention, according to one embodiment of the present invention.

FIG. 11 sets forth a flow diagram of method steps for processing graphics objects in a stage of a graphics processing pipeline, according to one embodiment of the present invention, according to one embodiment of the present invention. Although the method steps are described in conjunction with the systems of FIGS. 1-6, persons of ordinary skill in the art will understand that any system configured to perform the method steps, in any order, is within the scope of the inventions.

As shown, the method 1100 begins at step 1102, where the geometry processing unit 425 receives a graphics primitive for processing. At step 1104, the geometry processing unit 425 determines changes to one or more state parameters based on a number of factors, including, without limitation, the geometry shader program, the particular effect being generated, and the geometry primitive. At step 1106, the geometry processing unit 425 transmits the vertex position to a later stage in the graphics pipeline. In some embodiments, the geometry processing unit 425 may also transmit other per-vertex attributes.

At step 1108, the geometry processing unit 425 determines whether the current vertex is a provoking vertex for an associated geometry primitive, such as a line segment or a triangle. If the vertex is a provoking vertex, then the method 1100 proceeds to step 1110, where the geometry processing unit 425 transmits general attributes of the associated graphics primitive. For example, the geometry processing unit 425 could transmit various attributes that do not change over the graphics primitive, including, without limitation, the color of a flat shaded polygon, material attributes of a polygon, and whether a cut in the vertex chain occurs at the current vertex. At step 1112, the geometry processing unit 425 transmits state attributes. The state attributes are various attributes, such as those attributes described in conjunction with FIGS. 7-10, that can vary for each primitive in a graphics object. These state attributes include, without limitation, the width of a line segment within a polyline, the scissor box for a triangle rendered using conservative rasterization, and the multisample mask for a triangle rendered using motion blur.

At step 1116, the geometry processing unit 425 determines whether there are additional vertices to transmit for the current geometry primitive. If there are no additional vertices to transmit, then the method 1100 proceeds to step 1118, where the geometry processing unit 425 determines whether there are additional geometry primitives to transmit. If there are no additional geometry primitives to transmit, then the method 1100 terminates.

If, however, at step 1118, there are additional geometry primitives to transmit, then the method 1100 proceeds to step 1102, described above. If, at step 1116, there are additional vertices to transmit for the current geometry primitive, then the method 1100 proceeds to step 1104, described above.

Returning now to step 1108, if the current vertex is not a provoking vertex, then the method 1100 proceeds to step 1114, where the geometry processing unit 425 transmits dummy attributes in place of the general attributes and the state attributes. The method 1100 then proceeds to step 1116, as described above.

In sum, a geometry processing unit 425 receives graphics primitives from a graphics pipeline, and the geometry shader program executed by the geometry processing unit 425 is configured to modify one or more state parameters of downstream fixed function units on a per-graphics primitive basis. The geometry shader program may transmit the modified state parameters as vertex attributes associated with the various fragments transmitted by the geometry processing unit 425. The state parameters associated with a particular graphics primitive may be transmitted as part of the provoking vertex associated with the graphics primitive. Fixed function units downstream of the geometry processing unit 425 receive the state parameters as part of each received vertex. The fixed function units read the received state attributes and convert the state attributes into state bundles that control one or more aspects of the fixed function units.

One advantage of the disclosed techniques is that they enable graphics effects to be flexibly and efficiently performed in a graphics pipeline that includes both programmable and fixed-function elements Consequently, programmers can write geometry shader programs to create effects that benefit from per-primitive state parameter changes described herein, and the CPU is not burdened with subdividing graphics objects into smaller objects or graphics primitives in order to achieve those same effects, as is necessary in prior art approaches.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A method for processing graphics objects in a first stage of a graphics processing pipeline, the method comprising:
receiving a first graphics primitive associated with a graphics object;
generating, by the first stage of the graphics processing pipeline, a new value for a state parameter that sets a render state of a second stage of the graphics processing pipeline when the first graphics primitive is processed by the second stage of the graphics processing pipeline;
transmitting position information for a vertex included in the first graphics primitive;
determining whether the vertex is a provoking vertex; and
if the vertex is a provoking vertex, then transmitting the new value for the state parameter to the second stage of the graphics processing pipeline, or
if the vertex is not a provoking vertex, then transmitting one or more dummy attributes, instead of the new value for the state parameter, to the second stage of the graphics processing pipeline.

2. The method of claim 1, wherein the first stage of the graphics processing pipeline comprises a geometry processor configured to execute a geometry shader program.

3. The method of claim 1, further comprising:
receiving a second graphics primitive associated with the graphics object;
determining a plurality of attributes corresponding to a vertex associated with the second graphics primitive;
determining a second value for the state parameter based on a visual effect; and
transmitting the second value for the state parameter to the second stage of the graphics processing pipeline via a data structure that includes the plurality of attributes corresponding to the vertex associated with the second graphics primitive and one or more state parameters.

4. The method of claim 3, further comprising determining that the second value is different than the new value.

5. The method of claim 1, further comprising restoring the state parameter to a default value specified by a processor.

6. The method of claim 1, wherein a visual effect comprises a conservative rasterization effect, and the state parameter comprises a size and position of a bounding box associated with the first graphics primitive.

7. The method of claim 1, wherein a visual effect comprises a variable-width anti-aliased polyline, and the state parameter comprises a thickness associated with the first graphics primitive.

8. The method of claim 1, wherein a visual effect comprises a fine-grained depth bounds test, and the state parameter comprises a minimum depth value and a maximum depth value associated with the first graphics primitive.

9. The method of claim 1, wherein a visual effect comprises a motion blur effect, and the state parameter comprises a multisample mask associated with the first graphics primitive.

10. The method of claim 1, wherein a first vertex comprises a provoking vertex for the first graphics primitive.

11. The method of claim 1, wherein, if the vertex is a provoking vertex, further comprising transmitting one or more general attributes of the first graphics primitive to the second stage of the graphics processing pipeline.

12. The method of claim 11, wherein the one or more general attributes do not vary vertex-by-vertex across the first graphics primitive, and the state parameter varies across two or more graphics primitives associated with the graphics object.

13. A subsystem comprising:
a geometry processor configured to process graphics objects by performing the steps of:
receiving a first graphics primitive associated with a graphics object;
generating, by a first stage of a graphics processing pipeline, a new value for a state parameter that sets a render state of a second stage of the graphics processing pipeline when the first graphics primitive is processed by the second stage of the graphics processing pipeline;
transmitting position information for a vertex included in the first graphics primitive;
determining whether the vertex is a provoking vertex; and
if the vertex is a provoking vertex, then transmitting the new value for the state parameter to the second stage of the graphics processing pipeline, or
if the vertex is not a provoking vertex, then transmitting one or more dummy attributes, instead of the new value for the state parameter, to the second stage of the graphics processing pipeline.

14. The subsystem of claim 13, wherein the geometry processor is configured to execute a geometry shader program.

15. The subsystem of claim 13, wherein the geometry processor is further configured to perform the steps of:
receiving a second graphics primitive associated with the graphics object;
determining a plurality of attributes corresponding to a vertex associated with the second graphics primitive;
determining a second value for the state parameter based on a visual effect; and
transmitting the second value for the state parameter to the second stage of the graphics processing pipeline via a data structure that includes the plurality of attributes corresponding to the vertex associated with the second graphics primitive and one or more state parameters.

16. The subsystem of claim 15, wherein the geometry processor is further configured to perform the step of determining that the second value is different than the new value.

17. The subsystem of claim 13, wherein the geometry processor is further configured to perform the step of restoring the state parameter to a default value.

18. The subsystem of claim 13, wherein a visual effect comprises a conservative rasterization effect, and the state parameter comprises a size and position of a bounding box associated with the first graphics primitive.

19. The subsystem of claim 13, wherein a visual effect comprises a variable-width anti-aliased polyline, and the state parameter comprises a thickness associated with the first graphics primitive.

20. The subsystem of claim 13, wherein a visual effect comprises a fine-grained depth bounds test, and the state parameter comprises a minimum depth value and a maximum depth value associated with the first graphics primitive.

21. The subsystem of claim 13, wherein a visual effect comprises a motion blur effect, and the state parameter comprises a multisample mask associated with the first graphics primitive.

22. A system for processing graphics objects comprising:
a geometry processor;
a memory coupled to the geometry processor, wherein the memory includes an application program that includes instructions that, when executed by the geometry processor, cause the geometry processor to perform the steps of:
receiving a first graphics primitive associated with a graphics object;
generating new values for one or more state parameters that set a render state of a second stage of the graphics processing pipeline when the first graphics primitive is processed by the second stage of the graphics processing pipeline;
transmitting position information for a vertex included in the first graphics primitive;
determining whether the vertex is a provoking vertex; and
if the vertex is a provoking vertex, then transmitting the new value for at least one state parameter to the second stage of the graphics processing pipeline, or
if the vertex is not a provoking vertex, then transmitting one or more dummy attributes, instead of the new value for the at least one state parameter, to the second stage of the graphics processing pipeline.

* * * * *

UNITED STATES PATENT AND TRADEMARK OFFICE
CERTIFICATE OF CORRECTION

PATENT NO. : 9,830,741 B2
APPLICATION NO. : 13/671456
DATED : November 28, 2017
INVENTOR(S) : Emmett M. Kilgariff et al.

It is certified that error appears in the above-identified patent and that said Letters Patent is hereby corrected as shown below:

On the Title Page

(56) References Cited, Page 2:
Please delete "Eckstein, "Learning Java 2D, Part 1," 2005, retrieved on Dec 1, 2014 from http://www.oracle.com/technetwork/java/jacamail/java2dpart1-137217.html.*" and insert --Eckstein, "Learning Java 2D, Part 1," 2005, retrieved on Dec 1, 2014 from http://www.oracle.com/technetwork/java/javamail/java2dpart1-137217.html.*--.

Signed and Sealed this
Seventeenth Day of April, 2018

Andrei Iancu
*Director of the United States Patent and Trademark Office*